United States Patent
Schiffler

[19]

[11] Patent Number: 5,988,331
[45] Date of Patent: Nov. 23, 1999

[54] VIBRATION DAMPER WITH ADJUSTABLE DAMPING FORCE

[75] Inventor: Stefan Schiffler, Wonfurt, Germany

[73] Assignee: Fichtel & Sachs AG, Schweinfurt, Germany

[21] Appl. No.: 08/906,279

[22] Filed: Aug. 5, 1997

[30] Foreign Application Priority Data

Aug. 5, 1996 [DE] Germany .............. 196 31 608

[51] Int. Cl.[6] .................. F16F 9/46; F16F 9/36; B60G 17/08
[52] U.S. Cl. .................... 188/322.19; 29/527.1; 29/434; 188/266.6; 188/322.2; 285/382
[58] Field of Search .............. 188/322.19, 266.6, 188/315, 322.2, 322.13–322.14, 322.21; 29/434, 527.1; 285/382, 382.1, 382.2, 382.4; 267/64.28

[56] References Cited

U.S. PATENT DOCUMENTS

| | | | |
|---|---|---|---|
| 5,301,412 | 4/1994 | Hahn et al. | 188/322.2 |
| 5,353,898 | 10/1994 | Handke et al. | 188/322.2 |
| 5,398,789 | 3/1995 | Handke | 188/266.6 |
| 5,603,392 | 2/1997 | Beck | 188/266.6 |
| 5,685,400 | 11/1997 | Handke et al. | 188/322.19 |
| 5,740,890 | 4/1998 | Förster | 188/322.2 |

FOREIGN PATENT DOCUMENTS

| | | | |
|---|---|---|---|
| 40 14 469 A1 | 11/1991 | Germany . | |
| 40 31 760 A1 | 4/1992 | Germany . | |
| 4031761 | 4/1992 | Germany | 188/266.6 |
| 92 06 568 U | 8/1992 | Germany . | |
| 41 14 307 A1 | 11/1992 | Germany . | |
| 41 30 869 A1 | 3/1993 | Germany . | |
| 44 24 433 C1 | 10/1995 | Germany . | |
| 44 10 522 A1 | 12/1995 | Germany . | |

*Primary Examiner*—Douglas C. Butler
*Attorney, Agent, or Firm*—Cohen, Pontani, Lieberman & Pavane

[57] ABSTRACT

Disclosed is a vibration damper with an adjustable damping force and a method of producing the same. The adjustable vibration damper has a container tube to which is connected a shut-off valve arrangement. A damping medium is fed to the shut-off valve arrangement via a high-pressure partial length, an intermediate tube, if required, which is arranged inside the container tube, wherein the container tube and/or the intermediate tube with a cylinder in which a piston slides axially at a piston rod form the high-pressure partial length, and the container tube and/or the cylinder tube has a tube connection piece as a transition of the high-pressure partial length to the shut-off valve arrangement. The tube connection piece in at least one of the tubes forming the transition is constructed as a separate structural component part having a flange which contacts the inner region of the tube and projects through an opening in the tube.

5 Claims, 4 Drawing Sheets

VIBRATION DAMPER WITH ADJUSTABLE DAMPING FORCE

BACKGROUND OF THE INVENTION

The invention is in a vibration damper having an adjustable damping force.

A vibration damper with adjustable damping force is known from DE 40 31 760 A1, wherein a cylinder which is filled with damping fluid is centered in the container of the vibration damper. An inner container tube is arranged between the container and the cylinder to form a bypass duct to a valve arrangement positioned at the container. The inner container tube has an opening in which a connection piece of the valve arrangement is inserted. The transition between the opening and the connection piece is sealed by a sealing body which is placed on the inner container tube from the outside. The sealing body has seals which are inserted therein and which carry out the actual sealing function.

This solution entails two problems which are solved per se, but only at a relatively high cost. First, the hydraulic pressure in the bypass duct works on the connection piece in the lift off direction so that a correspondingly high pretensioning must be exerted on the seals. Further, a specially three-dimensionally curved seal must be inserted between the sealing body and the outer diameter of the cylinder and a correspondingly adapted sealing body itself must be provided for every variant of the cylinder outer diameter.

DE 44 24 433 C1 is directed to an intermediate tube for a vibration damper with adjustable damping force comprising a tube connection piece which has a covering with a valve seat body and forms a hydraulic connection with a controllable valve. Clamped within the tube connection piece is an intermediate ring which, in practice, lengthens the tube connection piece. In comparison to the proposal according to DE 40 31 760 A1, this solution offers the advantage that the opening in which the intermediate ring is clamped can be maintained constant substantially independent from the diameter of the intermediate tube, so that there is an appreciable standardizing effect. However, the materials which are necessary for the clamping action are mostly composed of plastic and are thus relatively sensitive to pressure and temperature.

German Utility Model DE-GM 92 06 568 U1 discloses an intermediate tube with a connection piece which is drawn from the intermediate tube so as to form one piece therewith. In the particular case of longer tube connection piece lengths, a radius is formed at the intermediate tube which provides a transition between the intermediate tube portion and the tube connection piece. In this solution, the flowability of the material imposes limits with respect to the forming of the tube connection piece. Further, a minimum wall thickness must be maintained so that the tube and connection piece can withstand the operating pressures which develop.

DE 44 10 522 A1 shows a hydraulic vibration damper with a jacket tube having a welded in tube connection piece within a collar of the jacket tube. In principle, the welding seam between the tube connection piece and the collar of the jacket tube is checked by means of a pressure test. Moreover, a working step is generally required for cleaning the jacket tube after the welding process.

A different approach is disclosed in DE 41 14 307 A1. A connection face for the tube connection piece is formed integral with the jacket tube in a planar manner, an adjustable bypass valve being welded onto this jacket tube. The tube connection piece is then placed on the plane connection face from the outside for the welding process, wherein the necessary welding seam lies in a plane and is not three-dimensionally curved.

The object of the present invention is to so develop a vibration damper with a shut-off valve arrangement arranged at the container tube such that even high operating pressures and temperatures can be maintained under control while allowing for a standardized application of the invention.

SUMMARY OF THE INVENTION

The above stated object is obtained according to the invention in that the tube connection piece in at least one of the tubes forming the transition is constructed as a separate structural component part which has a flange that contacts the inner region of the tube and projects through an opening in said tube. Deep drawing of the tube for forming the tube connection piece is advantageously dispensed with. Further, the selection of material is not restricted, since flowability no longer plays such a large part with respect to forming. The arrangement of the tube connection piece from the inside has the further significant advantage that the operating pressure prevailing in the vibration damper acts on the separate tube connection piece in the seat direction. Accordingly, a secured position of the tube connection piece is always ensured.

In a further advantageous construction of the invention, the opening of the tube is arranged in a plane region of the tube for the high-pressure partial length. No special radii need be formed on the flange to produce a sufficiently large contact surface relative to the inner region of the tube.

In one embodiment of the invention, the opening of the tube engages in an interference fit or press fit with the tube connection piece. During assembly, while there is no operating pressure, the tube connection piece is held in a frictional engagement to a sufficient extent.

In accordance with another advantageous feature, the flange of the tube connection piece is provided with an annular groove for a sealing ring. An annular groove need not be provided in the tube, since it is more expensive to manufacture the annular groove at this location than in the flange.

In the interest of the most economical manufacturing costs, the tube connection piece for the press fit has a longitudinal portion which is shorter than the length from the flange to the opposite end.

Further, in a process for producing a vibration damper according to the invention, the tube is provided with an opening wherein the working step is directed from the inside outward and a connection piece, in the form of a separate structural component part, is inserted through the opening via an open end of the tube until a flange of the tube connection piece contacts the inside region of the tube. It can be ensured by means of this directed working that any sharp edge or burr, which is inevitable when producing the opening, is outside of the vibration damper. This manufacturing method obviates the need for testing for tightness.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings, wherein like reference characters denote similar elements throughout the several views.

Figure 2:
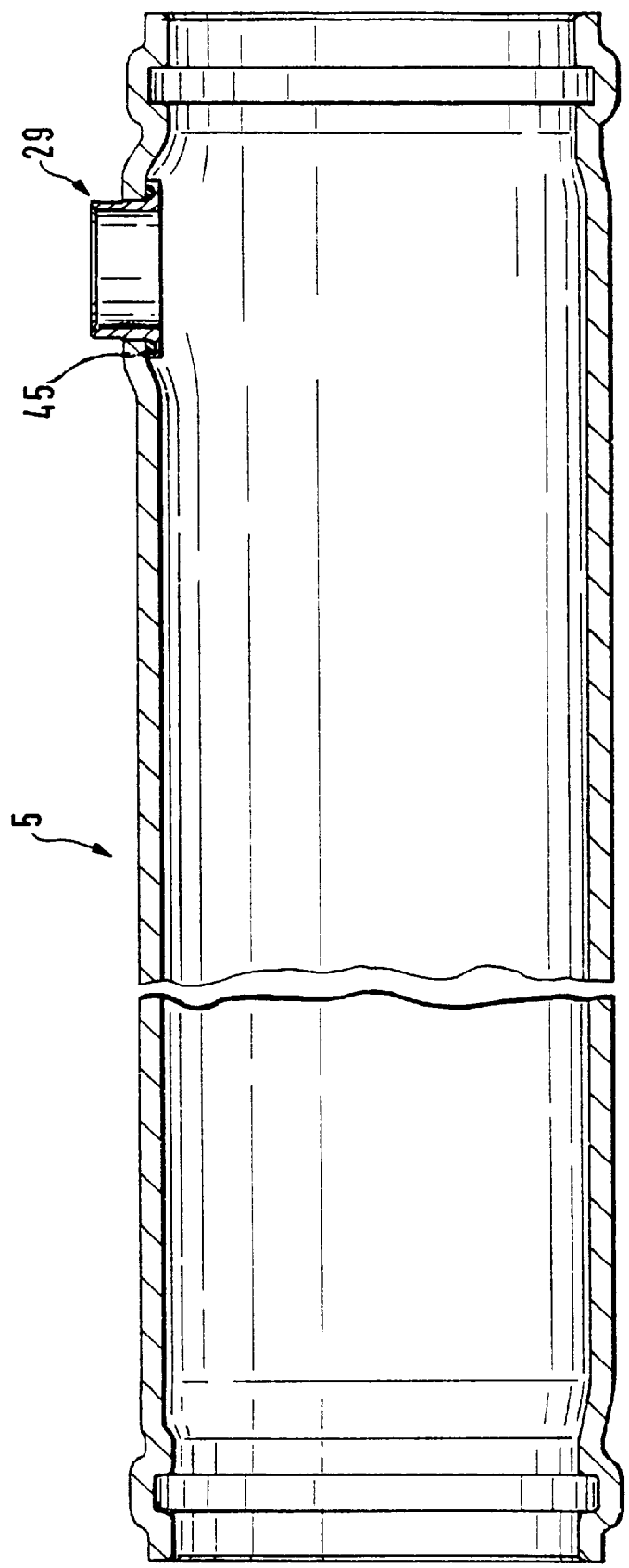
FIG. 2 shows a constructional unit having a container tube or intermediate tube with a tube connection piece.
Figure 3B:
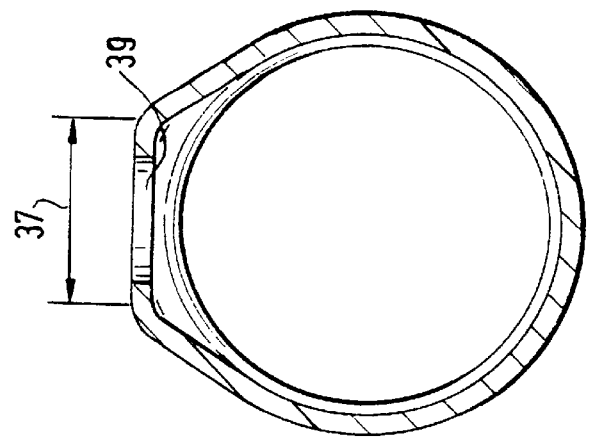
Figure 3A:
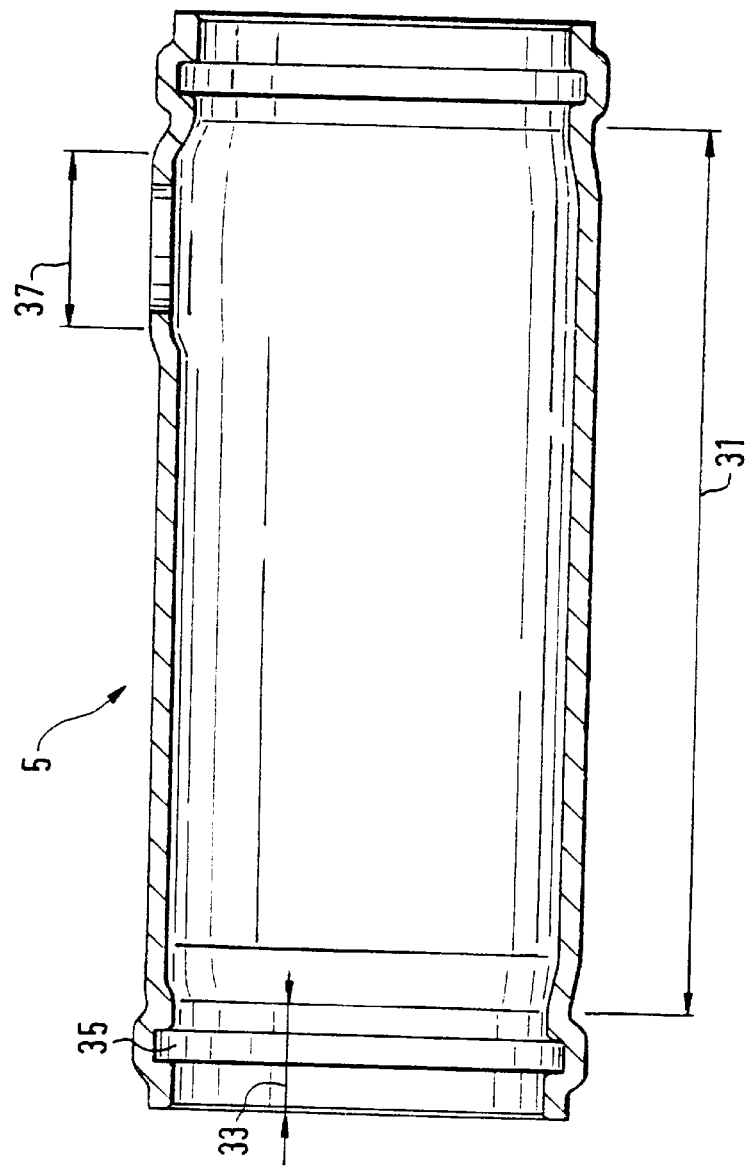
Figure 4:
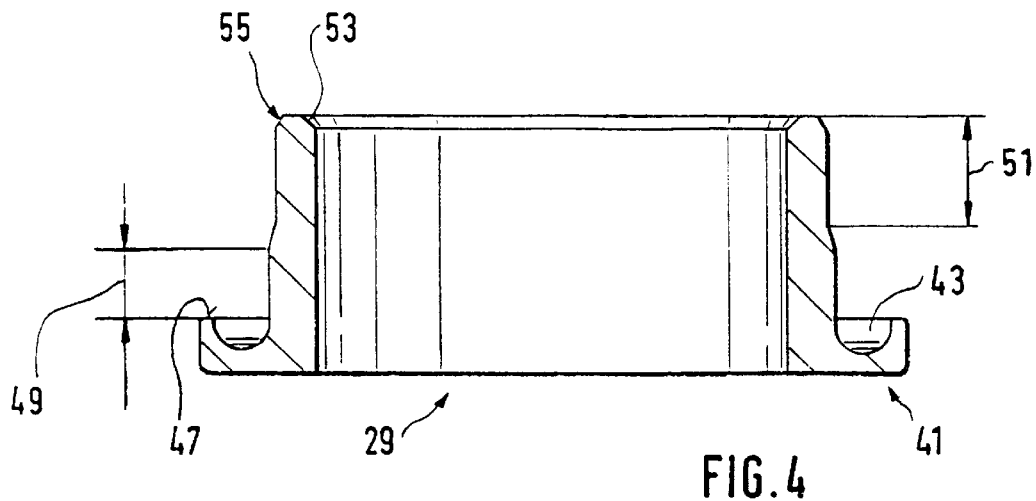

FIGS. 3(a) and 3(b) show an individual part of the constructional unit according to FIG. 2;

FIG. 4 shows a connective piece as a separate structural component; and

Figure 5:
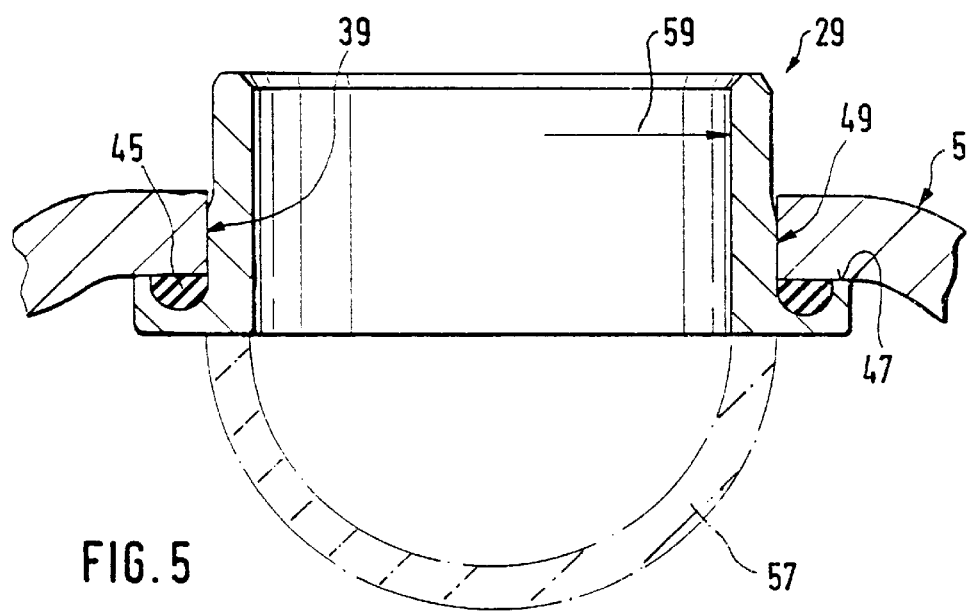

FIG. 5 shows an enlarged section according to FIG. 2.

DETAILED DESCRIPTION OF THE PRESENTLY PREFERRED EMBODIMENTS

Figure 1:
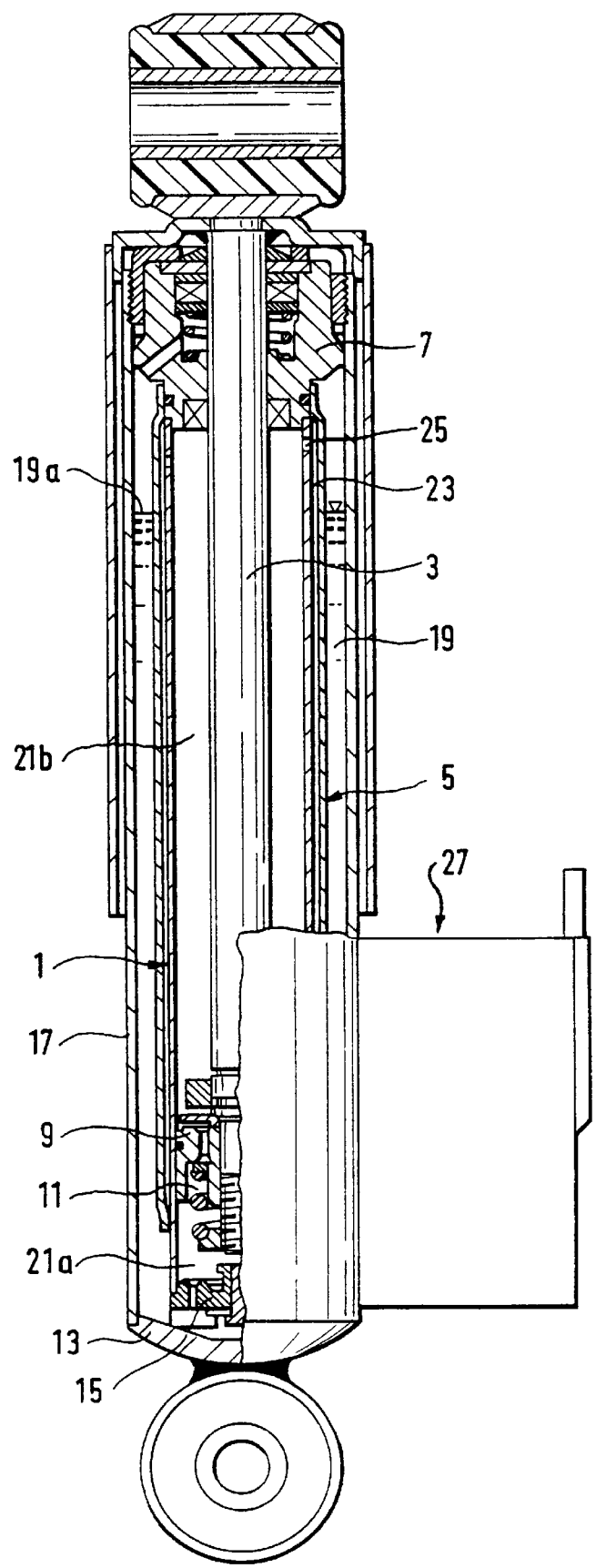
FIG. 1 is an overall view of a vibration damper in partial cutaway.

FIG. 1 shows a vibration damper having a cylinder 1 in which a piston rod 3 is arranged so as to be movable along the axial direction of the cylinder. A guiding and sealing unit 7 guides the piston rod 3 out of the upper end of the cylinder. Within the cylinder 1, a piston unit 9 with a piston valve arrangement 11 is secured to the piston rod 3. The lower end of the cylinder 1 is closed by a base plate 13 with a foot valve or bottom valve arrangement 15. The cylinder 1 is enclosed by a container tube 17. The container tube 17 and an intermediate tube 5 form an annular space 19 constituting a compensating chamber.

Piston unit 9 separates the space within the cylinder 1 into a first working chamber 21a and a second working chamber 21b. Each of the working chambers 21a and 21b is filled with pressure fluid. The compensating chamber 19 is filled with fluid to level 19a and above that with gas. A first guide distance, namely a high-pressure partial length, is formed within the compensating chamber 19 by the cylinders and the intermediate tubes and communicates with the second working chamber 21b via a bore hole 25 of the cylinder 1. A shut-off valve arrangement 27, which is mounted at the side of the container tube 17, adjoins this high-pressure partial length. A second guide distance, namely a low-pressure partial length, leads from the shut-off valve arrangement 27 into the compensating chamber 19.

When the piston rod 3 moves out of the cylinder 1 in the upward direction, i.e. toward guide and sealing unit 7, the length and volume of the upper working chamber 21b are reduced. The increased or overpressure which builds up in upper working chamber 21b is decreased by means of the piston valve arrangement 11 in the lower working chamber 21a as long as the shut-off valve arrangement 27 is closed. When the shut-off valve arrangement 27 is opened, fluid simultaneously flows from the upper work chamber 21b through the high-pressure partial length 23 and the shut-off valve arrangement 27 into the compensating chamber 19. The damping characteristic of the vibration damper when the piston rod 3 moves out is thus dependent on whether the shut-off valve arrangement 27 is more or less open or closed. The adjustability of the shut-off valve arrangement can be effected in a stepped or continuous manner.

When the piston rod 3 moves into the cylinder 1, pressure builds up in the lower working chamber 21a. Fluid can pass from the lower working chamber 21a through the piston valve arrangement 11 upward into the upper working chamber 21b. The bottom valve arrangement 15 forces the fluid displaced by the increasing piston rod volume within the cylinder 1 into the balance chamber 19. A pressure increase also occurs in the upper working chamber 21b since the flow through resistance of the piston valve arrangement 11 is less than the flow through resistance of the bottom valve arrangement 15. When the shut-off valve arrangement 27 is open, this increasing pressure can cause overflow into the compensating space 19 again through the high-pressure partial length 23. This means that when the shut-off valve arrangement 27 is open, the shock absorber also has a softer or smoother characteristic when the piston rod moves in when the shut-off valve arrangement 27 is open and a harder characteristic when the shut-off valve arrangement is closed just as when the piston rod moves out. In any event, the flow direction through the high-pressure partial length 23 of the bypass is always the same regardless of whether the piston rod moves in or out.

FIG. 2 only shows the constructional unit formed of the intermediate tube 5 and a separate tube connection piece 29. Of course, the container tube can also be used instead of the intermediate tube in accordance with the invention. In particular, an application of this kind is carried out in vibration dampers corresponding to FIG. 8 of DE 34 34 877 A1.

FIG. 3 shows the intermediate tube 5 by way of example as an individual part. The intermediate tube 5 is substantially formed of a high-pressure partial length distance 31 which is connected at both ends to guide portions 33 which, in turn, have sealing beads 35. The sealing beads receive the seals which seal the high-pressure partial length 23 relative to the compensating space 19 (see FIG. 1). An opening 39 is formed within a plane region 37 which also extends transversely to the intermediate tube axis.

When producing the opening, a punching die or punching tool is inserted into an open end of the intermediate tube so that a radially outwardly directed working movement is carried out. In this way a smooth cut component begins proceeding from the inner region of the intermediate tube. A punched out portion, not shown, which would be deleterious under normal circumstances lies outside of the intermediate tube. The zone or extent of tolerance for the diameter of the opening 39 tends to lie below the nominal value.

FIG. 4 shows an enlarged view of the tube connection piece 29 constructed as a separate structural component part. A flange 41 is formed at the end of the tube connection piece. The flange has an annular groove 43 in which is inserted a sealing ring 45 shown in FIG. 2. The flange has a contact surface 47 at the outer rim. A longitudinal portion 49 for a press fit with the opening 39 of the intermediate tube or of the container tube extends from the flange. The longitudinal portion 49 has a tolerance range for the outer diameter above the nominal amount. The length of the longitudinal portion is substantially limited to the wall thickness of the container tube or intermediate tube. Adjoining the longitudinal portion is another partial tube connection piece 51 which has a smaller outer diameter than the longitudinal portion 49 so as to facilitate assembly of the tube connection piece 29 as a whole. The partial tube connection piece has assembly bevels 53 and 55 for additional structural component parts of the shut-off valve arrangement 27 at the end sides (FIG. 1).

A particularly advantageous characteristic of the invention will be explained in connection with FIG. 5. As was described above, the opening 39 of the intermediate tube 5 and the longitudinal portion 49 of the tube connection piece 29 form a press fit so that when mounting the tube connection piece 29 of the intermediate tube or of the container tube through the open end from the inside outward, the tube connection piece continues to be held in its defined installation position exclusively by frictional engagement. The installation position is defined by the contact surface 47 relative to the plane region within the intermediate tube. The operating pressure within the high-pressure partial length 23 acts on a circular ring surface 57 which is calculated from the diameter of the opening 39 for the inner diameter 59 of the tube connection piece 29. Ideally, the entire flange surface could be safely assumed; however, slight leakage between the supporting surface 47 and the plane region inside the intermediate tube is not to be ruled out.

The embodiment illustrated by this figure also clearly shows an advantage in that the punched out portion which is formed when the opening 39 is produced lies outside of the intermediate tube. The sealing ring 45 can be inserted without re-machining the opening.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A process for producing a vibration damper with an adjustable damping force, said damper having an intermediate tube with an inner region, comprising: providing said tube with an opening, wherein the opening is formed by a work step directed from the inside of the tube to the outside of the tube and inserting a tube connection piece having a flange via an open end of the tube through the opening from the inside outward as a separate structural component part until the flange of the tube connection piece contacts the inner region of the tube.

2. The process of claim 1, wherein the opening is arranged in a plane region of the tube.

3. The process of claim 1, wherein the opening engages in a press fit with the tube connection piece.

4. The process of claim 3, wherein the tube connection piece for the press fit has a longitudinal portion which is shorter than the length from the flange to the opposite end.

5. The process of claim 4, wherein the flange of the tube connection piece has an annular groove for a sealing ring.

* * * * *